(12) United States Patent
Bearss et al.

(10) Patent No.: US 7,173,719 B2
(45) Date of Patent: Feb. 6, 2007

(54) INTEGRATED RASTER IMAGE PROCESSOR AND ELECTRO-PHOTOGRAPHIC ENGINE CONTROLLER

(75) Inventors: James Glenn Bearss, Boise, ID (US); Eric R. Hansen, McKinney, TX (US); Herman W. Harrison, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 815 days.

(21) Appl. No.: 10/205,379

(22) Filed: Jul. 24, 2002

(65) Prior Publication Data

US 2003/0043400 A1 Mar. 6, 2003

Related U.S. Application Data

(60) Provisional application No. 60/317,418, filed on Sep. 4, 2001.

(51) Int. Cl.
*G06F 15/00* (2006.01)
*G06K 1/00* (2006.01)

(52) U.S. Cl. ............... 358/1.13; 358/1.9; 358/1.18; 358/1.16; 358/1.15

(58) Field of Classification Search .............. 358/1.12, 358/1.13, 1.14, 1.15, 1.18, 1.9
See application file for complete search history.

(56) References Cited

U.S. PATENT DOCUMENTS 4,844,632 A * 7/1989 Minowa ............... 400/120.17
5,606,395 A * 2/1997 Yang et al. ............... 399/81
5,805,954 A * 9/1998 Takahashi ................ 399/44
6,021,258 A * 2/2000 Ishizu et al. ............. 358/1.9
6,215,968 B1 * 4/2001 Uehara et al. ............. 399/49
6,359,701 B1 * 3/2002 Yamada et al. .......... 358/1.2
6,446,556 B1 * 9/2002 Ida .......................... 101/484
6,710,792 B1 * 3/2004 Ito et al. .................. 347/233
6,970,923 B1 * 11/2005 Mukaiyama et al. ...... 709/223
7,046,389 B2 * 5/2006 Lopez et al. ............ 358/1.18
2002/0063875 A1 * 5/2002 Yoshikawa .............. 358/1.12
2002/0080404 A1 * 6/2002 Bearss et al. ............ 358/1.16
2003/0095277 A1 * 5/2003 Murakawa et al. ....... 358/1.14
2003/0197881 A1 * 10/2003 Inoue et al. ............. 358/1.12

* cited by examiner

*Primary Examiner*—Kimberly Williams
*Assistant Examiner*—Satwant Singh
(74) *Attorney, Agent, or Firm*—Robert D. Marshall, Jr.; W. James Brady; Frederick J. Telecky, Jr.

(57) ABSTRACT

This invention comprises a converged printer architecture for controlling both electro-photographic (EP) processing and raster image processing (RIP) of data for laser modulation over a video line. By converging EP process control with image processing control, significant advantages in cost, image quality, and output stability are achieved. A digital signal processor (DSP) serves as the central processing resource of the architecture. The DSP is well suited for the dual role of image processing and real-time feedback process control. The DSP can operate in open loop motor/motion control, print process control, and in closed loop feedback control including image processing adaptations for quality and stability enhancements.

7 Claims, 4 Drawing Sheets

INTEGRATED RASTER IMAGE PROCESSOR AND ELECTRO-PHOTOGRAPHIC ENGINE CONTROLLER

This application claims priority under 35 USC §119(e)(1) of Provisional Application No. 60/317,418, filed Sep. 4, 2001.

TECHNICAL FIELD OF THE INVENTION

The technical field of this invention is print controllers.

BACKGROUND OF THE INVENTION

Conventional computer printers typically utilize laser or ink-jet technology to transfer a raster description of the text and images to be printed into a complete printed page. Such printers make use of printer controllers that normally employ a combination of RISC processors and ASIC devices or ASIC devices having embedded RISC processors. Printer controllers perform the raster image processing required to convert the page description language (PDL) statements and raster files sent to the printer into a form that the printer can act upon.

Typically within the printer controller, the RISC/ASIC devices are employed in a pipeline to perform first the task of interpreting printer control language/post script instructions/data and forming a display list equivalent. The second stage performs rendering of data from display lists and converts it to printer specific raster data. These tasks usually require a significant amount of memory within the printer. Such local memory for the printer controller pipeline is usually supplied by way of standard memory modules SIMM/DIMM configured to suit the printer controller application.

FIG. 1 illustrates the prior art steps required to process the input data that a printer typically receives from a conventional personal computer (PC). The output from the PC normally is supplied by a printer driver 101 that prepares an output print file. This file includes a set of instructions and data in a page description language (PDL) or compressed bitmap format. These instructions and data may be transported to the printer via IEEE 1284 (Firewire) or Universal Serial Bus (USB) cabling or over a local area network and stored in an input buffer memory 102.

The first computational step in the printer controller pipeline is interpretation 103 of the data. The display list from interpretation 103 includes a description of individual elements of graphics data or text data along with the position of these elements on the page. The display list may be in a banded or a non-banded format. In a banded format discrete bands are defined and formed as a part of the processing. After rendering, a number of these bands collectively form a full printer controller output page. In a non-banded format, each page is interpreted as a unit. After rendering, this unit forms an integral part of printer controller output.

The rendering pipeline stage 104 reduces the interpreted data of the display list to printer specific raster data. This process is sometimes called rasterization. The output of the rendering process is a bit map format in which discrete digitized dots (pixels) are generated to control the output device (e.g. ink jet pen, laser drum) with proportions of the colors cyan, yellow, magenta, and black. The rendering step is well suited to digital processing operations commonly used in digital signal processor devices. After rendering, the bit map data is stored in an output buffer memory stage 105. This bit map data is sent as needed to the printer output mechanism 106.

FIG. 2 illustrates a high-level view of the full complement of printer pipeline functions of the prior art. The input data has a variety of sources, such as spooled jobs on disc 201, parallel printer port 202, Universal Serial Bus (USB) port 203, Ethernet TCP/IP port 204 and IEEE 1284 (Firewire) 205. Each data source has its specific data format. This data must be reduced to a common format for processing in the pipeline. Streams interface unit 207 adjusts the format of the input data as required. For example, data arrives in parallel form from parallel printer port 202 and is converted in streams interface unit 207 as necessary for uniform processing in later stages. Likewise, streams interface unit 207 often carries out format adjustments upon data from USB port 203 in queue coming from the host processor. Streams interface unit 207 sends data from USB port 203 through a serial to parallel interface which is accomplished by way of serial-in parallel-out register function. Ethernet TCP/IP port 204 allows clusters of computers connected by a local area network to share the same printer. FireWire port 205 allows world-wide access to a printer from any computer attached to the Internet.

Streams interface unit 207 sends data to the path that performs parallel interpretation of the composite postscript 208, printer control language (PCL) page pipeline 209 or other PDL interpreter 210. Page pipeline 209 re-assembles the results of the interpretation process into page format for page oriented processing before submitting page data to rendering unit 212. Postscript interpreter 208 or printer control language (PCL) interpreter 210 may send banded format data directly to rendering unit 212. Rendering unit 212 also performs compression, decompression or screening as required. PDL print controller to print engine controller interface unit 225 supplies data and control information to input/output interface elements 213 to drive paper path controller 216, display/control unit 214 and video data unit 215.

The typical printer controller includes two circuit boards. The basic image processing and major hardware control is performed in PDL print controller board 220. This typically contains RISC processor 211 and application specific integrated circuit (ASIC) print engine controller 226 and memory 221. The second circuit board is print engine controller board 222. Print engine controller board 220 includes input/output interface elements 213, display/control unit 214, video data unit 215, and paper path controller 216. PDL print controller to print engine controller interface 225 provides data and control exchange between PDL print controller board 220 and print engine controller board 222.

Print engine controller board 222 encapsulates the printer mechanical and the electro-photographic (EP _processing environment. Print engine controller board 222 provides a consistent interface to PDL print controller board 220. Because it is self contained, print engine controller board 222 constrains ability of PDL print controller board 220 to do EP process control and to dynamically adjust image quality. As part of the overall printer architecture, print engine controller board 222 is equivalent to an un-modifiable engine device driver.

Image density sensor 224 reads the density of a test pattern written to the organic photoconductor (OPC). Print engine controller board 222 makes voltage adjustments to produce a toner density on the organic photoconductor that corresponds to gray scale expected form the test pattern image. Prior art has controlled the printing EP process by using a one-shot calibration at power up and optionally a periodic calibration cycle over time. These calibrations use of the image density sensor 224 and sometimes use a relative humidity sensor to help determine the setting.

FIG. 3 illustrates the construction of a typical laser printer. Protective casing 301 houses the laser energy source, a laser diode 300. Video information 302 to be printed modulates the current to laser diode 300. Rotating multi-faced mirror 303 deflects the laser beam within housing 301, which then impinges on the photoconductor drum 304. The charging roller 305 supplies a source of electrons to the photoconductor drum 304 creates a charge image of the video information on that surface. Toner development roller 306 transfers resin particles from the toner onto photoconductor drum 304. Toner charge and toner level mechanism 307 maintains the toner charge and toner level. Transport rollers 309 and fuser roller 310 drive the intermediate transfer media (ITM) 311. Intermediate transfer media 311 retrieves a toner charged version of the video information at interface 325 between photoconductor drum 304 and transfer roller 315. Transfer belt charge management roller 312, transfer belt temperature/charge regulator 313, peltier cooler 316, fuser temperature/charge regulator 317, heated discharge AC corona 318 and color density detector 319 act to prepare the intermediate transfer media image for transfer to the paper surface at the fuser roller 310. Paper rollers 314 complete the transport of the paper through the machine. FIG. 3 illustrates the full set control tasks which must act in concert to assure the desired laser printer output quality. These include top of form detector 320, paper property detector 321, beam detector 322, paper pickup 323 and paper jam detector 324.

SUMMARY OF THE INVENTION

This invention comprises a converged architecture for controlling both the electro-photographic (EP) process and raster image processing (RIP) of data for laser modulation over a video line. By converging EP process control with image processing control, significant advantages in cost, image quality and output stability are achieved.

At the center of the architecture is a digital signal processor (DSP). The digital signal processor is well suited for the dual role of image processing and real-time feedback process control. The digital signal processor can operate in open loop motor/motion control, print process control, and in closed loop feedback architectures that include image processing adaptations for quality and stability enhancements.

The present invention describes an implementation of the full instrumentation electro-photographic process for a laser printer as a preferred embodiment. It uses sensor readings it obtains in a formula based model to track and adjust via actuator, motors, and voltage setting the toner chemistry and EP process. The sensor readings can be performed either in between normal imaging cycles of during those imaging cycles. This allows real-time adjustment of the printing process parameters to achieve best quality.

BRIEF DESCRIPTION OF THE DRAWINGS

These and other aspects of this invention are illustrated in the drawings, in which.

DETAILED DESCRIPTION OF PREFERRED EMBODIMENTS

The present invention proposes implementation of the full instrumentation of the electro-photographic process. It uses sensor readings it obtains in a formula based model to track and adjust via actuator, motors, and voltage setting the toner chemistry and electro-photographic process. The sensor readings can be performed either in between normal imaging cycles or during those imaging cycles. This allows real-time-adjustment of the printing process parameters to achieve best quality.

Figure 4:
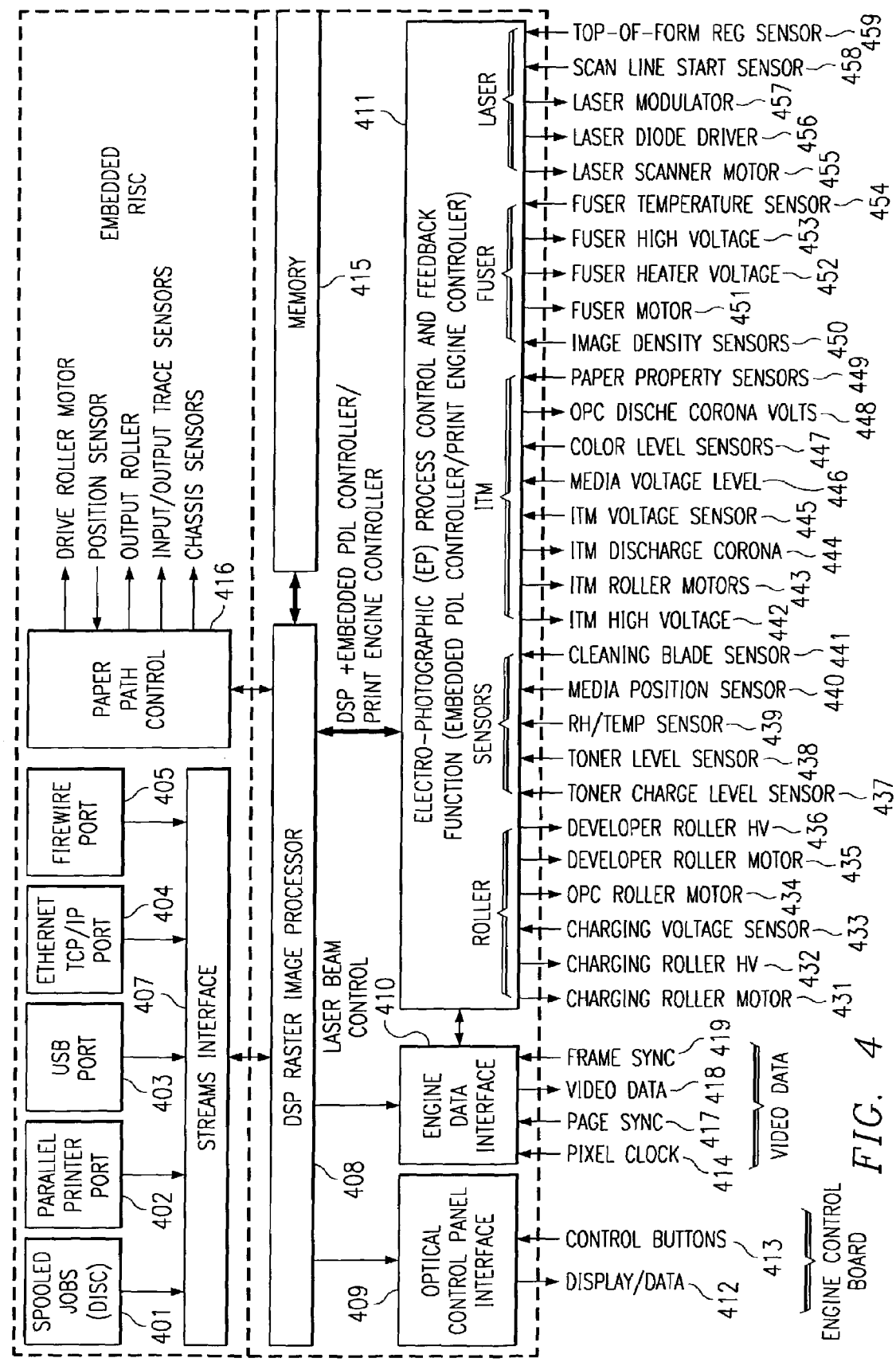
FIG. 4 illustrates the laser printer system of this invention comprising an integrated electro-photographic process controller performing both PDL/raster image process control and print engine control.

FIG. 4 illustrates the digital signal processor centric converged architecture printer system of this invention. The major controller functions of page description language (PDL) controller and the print engine controller are partitioned on two circuit boards in prior art systems. Both these major controller functions are integrated into a single EP process control and feedback function 411. The architecture of FIG. 4 includes: (1) a digital signal processor image processor 408; (2) the embedded EP process control and feedback function 411; and (3) a simple embedded RISC processor to manage input functions 401 to 405 and streams interfacing 407. Chip integration technology available at present in digital signal processors or application specific integrated circuits (ASIC) allows several approaches. The majority of the required functions may be placed on a single silicon chip. Alternatively, the functions may be partitioned as necessary to meet specific cost goals.

This architecture takes advantage of the computational power of the digital signal processor, utilizing not only its image processing capability, but its capability to process real-time feedback control loops. In the compact integrated architecture, the digital signal processor may be made to operate not only in open loop motor/motion control, print process control tasks, but also in closed loop feedback-oriented tasks that include image processing adaptations for quality and stability enhancements.

Figure 1:
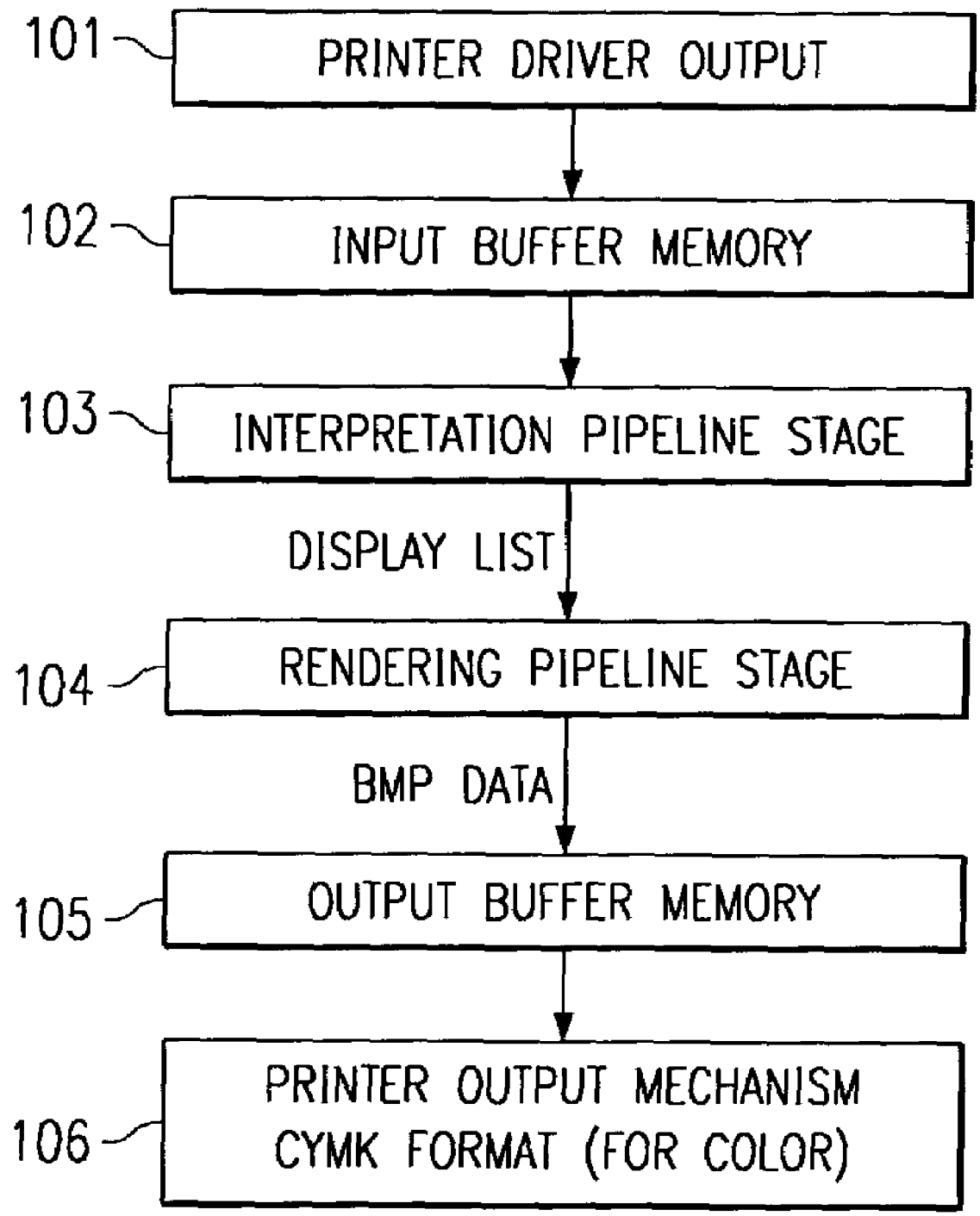
FIG. 1 illustrates the prior art printer controller pipeline.
Figure 2:
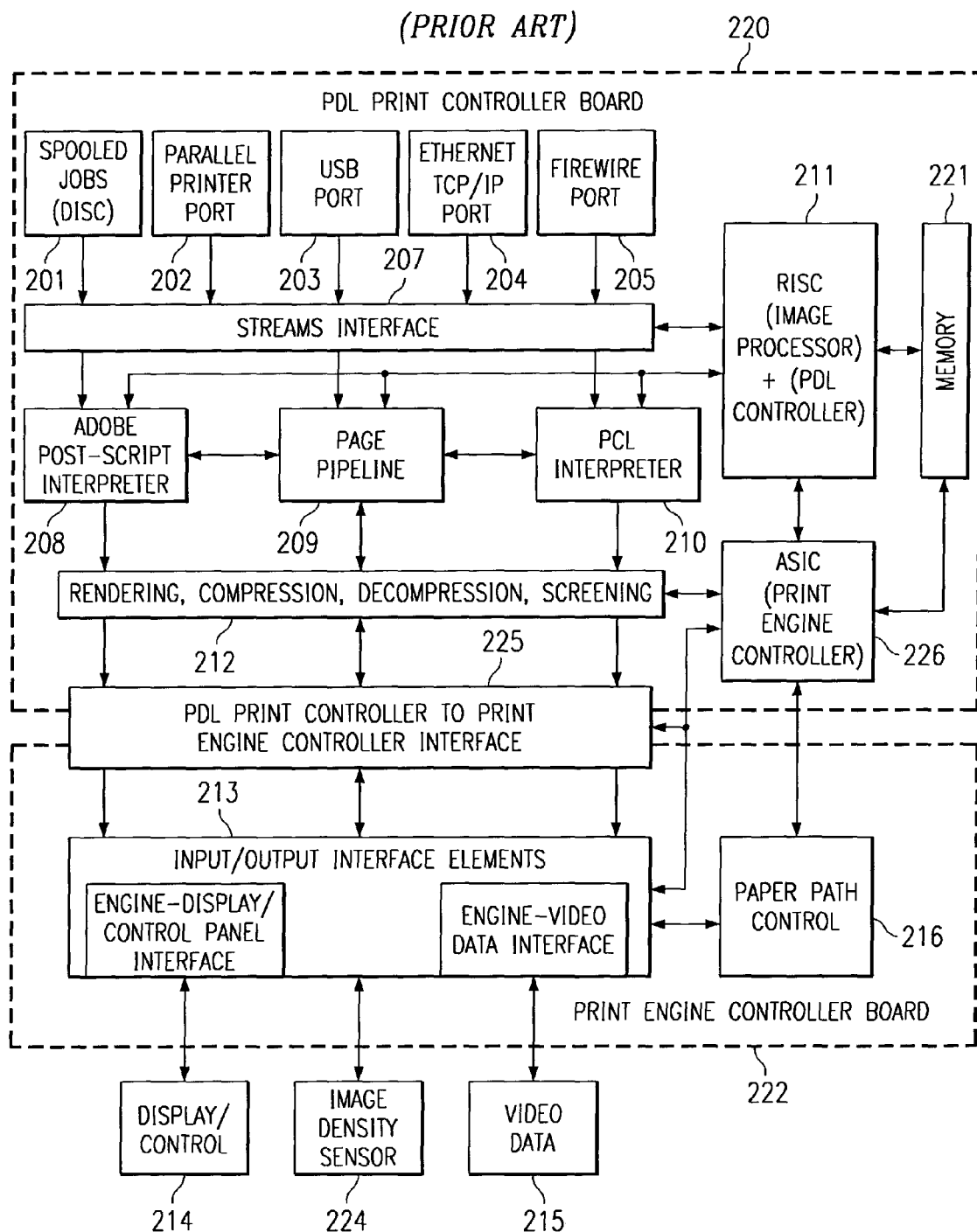
FIG. 2 illustrates a prior art printer system with a page description language (PDL) printer controller board interfaced with a separate print engine controller board.
Figure 3:
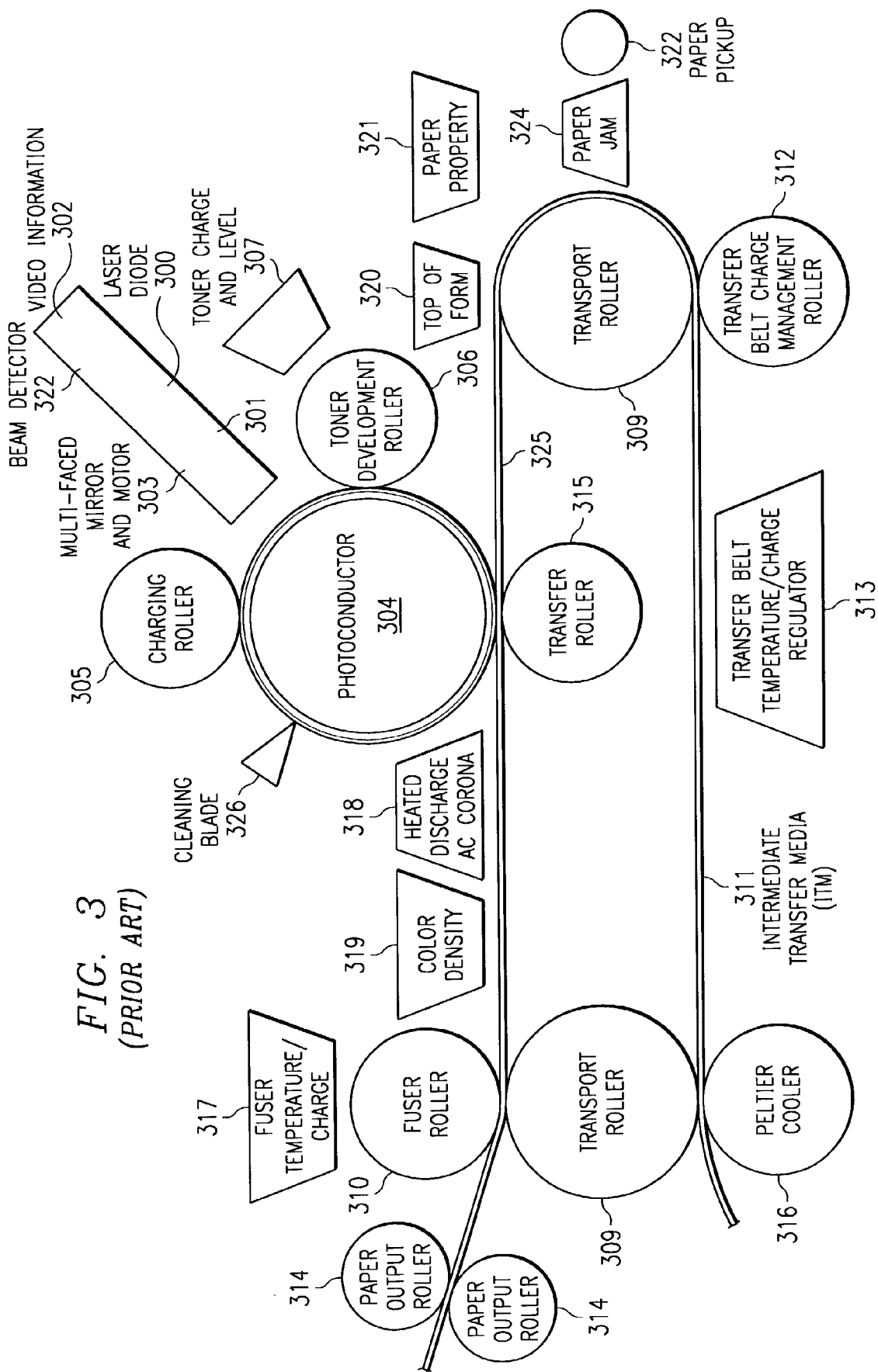
FIG. 3 illustrates a prior art laser printer system with the full complement of electrical, mechanical, and electro-mechanical functions and control mechanisms.

The organic photoconductor (OPC) surface of photoconductor drum 304 in FIG. 3 is a specially coated cylindrical surface which is charged with electricity from charging roller 305. Laser diode 300 writes an image to photoconductor drum 304 by selectively removing the electric charge as it scans over the drum. The toner charge and toner level mechanism 307 adjusts the toner charge so the correct amount of toner will be attracted to the image on photoconductor drum 304.

The intermediate transfer media (ITM) 311 is given a voltage to attract and keep the toner deposited on photoconductor drum 304. Once all color planes have been collected they can be transferred to paper in a single pass.

Fuser roller 310 permanently bonds the toner image to the paper by heating the toner and paper as the paper passes between fusing rollers. Returning to FIG. 4, additional sensors are used to align the top of drum where the EP images are placed with the top edge of the paper so that both are in proper registration.

The optical control panel 409 provides a graphical user interface (GUI) by which the PDL program communicates with the user. Optical control panel 409 displays print status during printing, printer state and error conditions. It guides the user through maintenance such as paper and toner replacement. Optical control panel 409 supplies display/data 412 to the engine control board (not shown). Optical control panel 409 receives control button actuation signals 413 from the engine control panel.

Engine data interface 410 provides the low level autonomous control of the printing process. Engine data interface 410 receives pixel clock 414, page synchronization signal 417 and frame synchronization signal 419. Engine data interface 410 generates video data 418 for control of laser diode 300 (FIG. 3). Engine data interface 410 thus provides synchronization of video with paper movement, movement of photoconductor drum 304 in response to commands sent from the RIP/PDL application.

Electro-photographic processor control and feedback function 411 interfaces with roller functions, sensors, the intermediate transfer media (ITM), fuser functions and laser functions. Roller functions include an input charging voltage sensor 433 and outputs to charging roller motor 431, charging roller high voltage (HV) 432, organic photoconductor (OPC) roller motor 434, developer roller motor 435 and developer roller high voltage (HV) 436. Sensor inputs include toner charge level sensor 437, toner level sensor 438, relative humidity (RH) and temperature sensor 439, media position sensor 440 and cleaning blade sensor 441. Intermediate transfer media (ITM) functions include inputs intermediate transfer media (ITM) voltage sensor 445, media voltage level 446, color level sensors 447, organic photoconductor (OPC) discharge corona voltage 448, paper property sensors 449 and image density sensors 450. Intermediate transfer media (ITM) functions include outputs intermediate transfer media (ITM) high voltage 442, intermediate transfer media (ITM) roller motors 443 and intermediate transfer media (ITM) discharge corona 444. Fuser functions include input fuser temperature sensor 454 and outputs fuser motor 451, fuser heater voltage 452 and fuser high voltage 453. Laser functions include inputs scan line start sensor 458 and top of form registration sensor 459 and outputs laser scanner motor 455, laser diode drive 456 and laser modulator 457. These permit delivery of consistent quality images over all operating conditions and ranges as well as for the life time of the print engine hardware. The first print ever made on the printer will have quality consistent with the next print. This process includes major hardware component replacement in addition to replacement of consumable components. This high level of quality will thereby extend from machine to machine of the same model.

The new architecture uses feedback loops to adjust electro-photographic process parameters for changes in toner charging, media properties, and motion artifacts. Closed loop control employs sensors of:

1. media roughness,
2. heat capacity,
3. dielectric thickness,
4. toner tribo-charging level,
5. average developed mass per page,
6. transferred toner optical density,
7. photoconductor artifacts, and
8. media motion artifacts.

From this sensor data, developer and transfer biases, fuser temperature and laser modulation adjustments are made.

Open loop sensors in the paper path and transfer fuser elements are used to control process set points. Sensing of transferred optical density of each color plane coupled with color gamut control points are used to adjust color management parameters and screening.

Some examples of uses for the combined raster image processing and electro-photographic control follow. This is by no means an exhaustive list.

This invention enables optimization of the spin-up and stabilization time. This reduces the first-page-out time by using sensors scan line start signal 458 and top-of-form registration signal 459 illustrated in FIG. 4. Scan line start and top-of-form registration are not related to laser spin-up and stabilization time. Spin-up and stabilization time is minimized by controlling the motor driving the spinning mirror (303) in the laser scanner. The nature of the feedback mechanism to control the rate of spin up and spin down and keep the rotation constant is similar to the strategies used to control any spinning motion such as found in digital signal processing applications in washing machines and dryers. Scan line start signal 458 is used to time the data being feed to the laser modulator. As the laser beam hits the photoconductor at the side print margin, this signal starts modulation of the laser beam for that scan line.

Top-of-form registration signal 458 tells the system the paper location within the paper path and establishes the top print margin. Both of these signals can be are typical of application specific integrated circuit (ASIC) driven solutions but the programmability of the digital signal processor in this application allows more flexibility for manufactures and end-users to change the timing as desired in new the applications. The important issue is not that other ASIC based methods could be employed but that the digital signal processor system control gives the print process architect new programmable ways to control the system, more dynamically using a broader range of control parameters, to establish print process control.

This invention enables control of paper feed by changing the rate and/or force of feeding mechanism based on paper smoothness sensor readings or motion resistance readings. This control is initiated by using paper property sensor 321 illustrated in FIG. 3. Paper property sensor 321 produces paper property signal 449 illustrated in FIG. 4. The important issue is the ability of the digital signal processor to use a motion feed back loop to dynamically adjust pressure on feed nip and the rate of rotation of feed nip to insure the paper gets feed properly.

The ability to handle the feeding of a wide range of paper grades reliably is an important challenge on all laser print systems. Such control increases reliability and extends the range of paper grades that a given print system can feed reliably.

This invention permits adjusting the charging AC/DC voltages to stabilize the contrast potential on photoconductor drum 304 as it changes with age and printing environment. This control employs input from charging voltage sensor signal 433 and adjusts charging roller high voltage 434. The difference in the level of charge on photoconductor drum 304 in unexposed areas versus the level of charge in laser-exposed areas is the known as the contrast potential. Several factors affect the difference and it changes over time and with temperature and humidity. Once again digital signal processing software control of this parameter coupled with the toner charging parameters allows the print process architect new ways to develop algorithms to stabilize toner development. In an application specific integrated circuit (ASIC) based controller system this is possible, but is not be practical given the complex relationships and calculation required to control these design elements. The digital signal processor programmability and fast real time feedback loops are a special advantage.

Adjust the pre-rotation in developer and AC/DC development voltage based on tribo-charging sensor feedback at the charging roller 305 in FIG. 3. This could also be done using readings from relative humidity (RH) and temperature sensors 439. Temperature and relative humidity inputs will feed back and form the basis of calculations for controlling toner development in conjunction with the inputs in 3 above.

The pre-rotation in the developer is another start-up operation. The faster the charge is established and stabilized the faster the print process can begin. Controlling the rate of pre-rotation and time of the pre-rotation based upon measured toner charge will speed up first page out.

Adjust the AC/DC voltages and fuser roller pressure based upon media roughness and dielectric thickness sensor measurements. The main issue here is that the DSP can control the pressure in the fuser nip and the AC/DC waveform applied to the nip. The direct current flowing in the transfer nip is controlled in existing print process but not the waveform coupled with the pressure. Controlling the waveform and the pressure controls the direct current but will also alter the electric field in the nip and in the pre- and post- nip regions. This control will reduce toner explosions and create sharper developed print edges. Fast-complicated calculation, well suited to the DSP control system, can be performed based upon several feedback-input signals.

Change fuser roller AC/DC voltages and heater current based upon media heat capacity and thickness sensor measurements. This can be done within a page to keep constant temperature across the page, top to bottom of page, as well as page to page with adjusted AC/DC voltages and heater current applied at outputs 451, 452 and 453. The issue is that feedback control of the temperature profiles and electric field in the fuser nip can be achieved. Digital signal processor 408 allows more dynamic and flexible control of these parameters, insuring better fusing, less toner offset, over a wider range of paper stock. The parameters in the fuser nip can be set and/or calculated base upon paper properties at the page level or changed within the page based upon area sensor feedback across and down the page. This is also true of fuser and paper feed properties.

Keep a constant force on photoconductor cleaning blade based upon resistance to motion of the photoconductor. Input sensing is done at cleaning blade sensor 441. As environmental properties and wear change the surface of the photoconductor, the toner adhesion to the surface of the photoconductor will also change. To effectively clean the surface of the photoconductor pressure on the cleaning blade will also have to change. Using the parameters measure above, coupled with total rotation count, algorithms can be developed to adjust the pressure and insure more effect cleaning without excessive photoconductor surface wear.

Keep photoconductor rotation constant within a page thus reducing banding effects. Output is applied to organic photoconductor (OPC) roller motor 434. Prior art for control of banding do use digital signal processor feedback control. They are included here as other examples of digital signal processor based print process control. The idea is an extension of motor and motion control using encoder feed back to insure constant motion and minimize the jitter induced by gear trains.

Banding can be reduced by adjusting laser modulation based upon encoder readings from photoconductor drum. Output is applied at laser scanner motor drive 455. The idea here is to change the exposure level by changing laser modulation scan line by scan line based upon feedback from photoconductor drum motion sensors. If the motion will bring two scan lines to close to each other, over development would occur. By reducing the exposure of one of the scan, line over exposure would not occur and perceivable dark line or bands would not appear.

What is claimed is:

1. A printer controller comprising:
   at least one input port for receiving print data in a page descriptive language format;
   a digital signal processor connected to said at least one input port;
   a print engine controller bidirectionally coupled to said digital signal processor, said print engine controller supplying print control signals to a print engine under control of said digital signal processor and receiving printer sensor signals from the print engine for supply to said digital signal processor;
   said printer sensor signals includes at least one optical density sensor of a printed page; and
   wherein said digital signal processor is programmed to:
      convert said print data from said page descriptive language format into print data for supply to the print engine via said print controller, said conversion including screening,
      provide real time feedback control of a print process of the print engine via control of said print control signals in response to said printer sensor signals, and
      respond to said at least one optical density sensor to adjust screening in said conversion of said print data from said page descriptive language format into print data for supply to the print engine to maintain uniform optical density in the printed page.

2. The printer controller of claim 1, further comprising:
   a paper controller bidirectionally coupled to said digital signal processor, said paper controller supplying paper movement control signals to the print engine under control of said digital signal processor and receiving paper position sensor signals from the print engine for supply to said digital signal processor; and
   wherein said digital signal processor is further programmed to provide real time feedback control of paper movement of the print engine via control of said paper movement control signals in response to said paper position sensor signals.

3. The printer controller of claim 1, wherein:
   said printer sensor signals includes a paper smoothness sensor;
   said digital signal processor is further programmed to respond to said paper smoothness sensor to adjust said paper movement control signals for supply to the print engine to maintain uniform paper movement velocity.

4. The printer controller of claim 1, further comprising:
   a control panel interface bidirectionally coupled to said digital signal processor, said control panel interface receiving operator input signals from a control panel and supplying control panel display signals to the control panel under control of said digital signal processor; and
   wherein said digital signal processor is further programmed to:
      control printer operation in response to operator input signals; and
      supply display data corresponding to current printer status to an operator via said control panel display signals.

5. The printer controller of claim 1, wherein:
   said print control signals includes a photoconductive drum charging high voltage signal;

said printer sensor signals includes a photoconductor drum charging sensor; and said digital signal processor is further programmed to respond to said photoconductor drum charging sensor to maintain a uniform photoconductive drum charging high voltage signal.

6. The printer controller of claim 1, wherein:

said print control signals includes a photoconductive drum drive signal; and said digital signal processor is further programmed to maintain a uniform photoconductive drum velocity.

7. The printer controller of claim 1, wherein:

said print control signals includes a laser modulation signal;

said printer sensor signals includes at least photoconductor drum motion sensor; and said digital signal processor is further programmed to respond to said at least photoconductor drum motion sensor adjust said laser modulation to maintain a uniform print density.

* * * * *